US012569959B2

(12) United States Patent  
Osawa et al.

(10) Patent No.: US 12,569,959 B2  
(45) Date of Patent: Mar. 10, 2026

(54) FASTENING TOOL

(71) Applicant: MAX CO., LTD., Tokyo (JP)

(72) Inventors: Yusuke Osawa, Tokyo (JP); Kazuya Takeuchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 279 days.

(21) Appl. No.: 18/137,400

(22) Filed: Apr. 20, 2023

(65) Prior Publication Data

US 2023/0347479 A1    Nov. 2, 2023

(30) Foreign Application Priority Data

Apr. 28, 2022    (JP) ................................. 2022-073940

(51) Int. Cl.
| | |
|---|---|
| *B25B 21/00* | (2006.01) |
| *B25B 23/00* | (2006.01) |
| *B25B 23/06* | (2006.01) |
| *H02P 23/14* | (2006.01) |

(52) U.S. Cl.  
CPC ............ *B25B 21/002* (2013.01); *H02P 23/14* (2013.01); *B25B 23/0035* (2013.01); *B25B 23/06* (2013.01)

(58) Field of Classification Search  
CPC . B25B 21/001; B25B 21/002; B25B 23/0035; B25B 23/06  
See application file for complete search history.

(56) References Cited

U.S. PATENT DOCUMENTS

| | | | | |
|---|---|---|---|---|
| 5,353,882 | A | * | 10/1994 | Inoue .................... B25B 23/147 |
| | | | | 173/176 |
| 7,938,305 | B2 | | 5/2011 | Simonelli et al. |
| 10,011,006 | B2 | | 7/2018 | Sergyeyenko et al. |
| 2016/0256213 | A1 | * | 9/2016 | Kust ..................... B25B 23/147 |
| 2019/0283230 | A1 | * | 9/2019 | Sakakibara ............. B25B 21/00 |
| 2020/0100799 | A1 | | 4/2020 | Delman et al. |
| 2022/0126409 | A1 | | 4/2022 | Sugioka et al. |
| 2022/0126431 | A1 | | 4/2022 | Ootsuka |

FOREIGN PATENT DOCUMENTS

| | | | |
|---|---|---|---|
| DE | 11-2019-002917 | T5 | 3/2021 |
| JP | 5262461 | B2 | 8/2013 |
| JP | 6197547 | B2 | 9/2017 |
| JP | 2020-006453 | A | 1/2020 |
| JP | 2020-163557 | A | 10/2020 |
| JP | 2021-079471 | A | 5/2021 |

OTHER PUBLICATIONS

Nov. 7, 2023—(EP) Extend Search Report—App 23169359.9.

* cited by examiner

*Primary Examiner* — Michelle Lopez  
(74) *Attorney, Agent, or Firm* — Banner & Witcoff, Ltd.

(57) ABSTRACT

A fastening tool includes a bit holding portion configured to hold a driver bit engageable with a screw and that is rotatable in a circumferential direction and movable in an axial direction of the driver bit, a motor configured to rotate the bit holding portion, a controller configured to control the motor, and a detector configured to detect a state of the motor. In a state where the screw engaged with the driver bit is fastened to a fastening target, the controller determines whether the driver bit and the screw are disengaged based on the state of the motor detected by the detector and stops the rotation of the motor in a case where the controller determines that the driver bit and the screw are disengaged.

8 Claims, 12 Drawing Sheets

ROTATION SPEED V OF MOTOR

ROTATION SPEED V1 OF BIT ROTATION MOTOR

DISENGAGEMENT BETWEEN DRIVER BIT AND SCREW T3

ROTATION SPEED V2 OF BIT MOVEMENT MOTOR

TIME T

LOAD GENERATION T1

ROTATION OF BIT MOVEMENT MOTOR BY PREDETERMINED AMOUNT T2

CURRENT OF BIT ROTATION MOTOR

DISENGAGEMENT BETWEEN DRIVER BIT AND SCREW T3

TIME T

LOAD GENERATION T1

FASTENING TOOL

CROSS-REFERENCE TO RELATED APPLICATIONS

This application is based upon and claims the benefit of priority from prior Japanese patent application No. 2022-073940, filed on Apr. 28, 2022, the entire contents of which are incorporated herein by reference.

TECHNICAL FIELD

The present disclosure relates to a fastening tool in which a driver bit is engaged with a screw, the screw is pressed against a fastening target by the driver bit, and the driver bit is rotated to be screwed.

BACKGROUND ART

There is known a tool referred to as a portable driving machine that uses an air pressure of compressed air supplied from an air compressor or a combustion pressure of gas to sequentially punch a coupling stopper loaded in a magazine from a tip of a driver guide.

In a tool in which a bit is rotated to fasten a screw and is moved in a direction in which the screw is driven, in the related art, a pneumatic screw driving machine in which a bit is rotated by an air motor and moved by an air pressure in a direction in which the screw is driven is proposed (for example, refer to Japanese Patent No. 5262461).

Further, a screw driving machine that compresses a spring by a driving force of a motor for rotating a driver bit and drives a screw by moving the driver bit in an axial direction with biasing force of the spring is proposed (for example, refer to Patent No. 6197547).

When the driver bit is engaged with a recess of the screw and the driver bit is rotated to fasten the screw, since the recess of the screw and the tip of the driver bit are in contact with each other at an inclined surface, a part of a rotation torque for rotating the driver bit acts a force in a direction for moving the driver bit away from the screw. Therefore, an amount of engagement between the driver bit and the recess of the screw may vary depending on a strength of a force pressing the screw driving machine toward the fastening target.

As described above, when the amount of engagement between the driver bit and the recess of the screw varies, a fastening depth of the screw may not be constant, and finish may not be stable. For example, a head portion of the screw may be embedded in the fastening target.

The present disclosure is made to solve such matter, and an object of the present disclosure is to provide a fastening tool in which a fastening depth of a screw fastened into a fastening target is constant regardless of a variation in an amount of engagement between a driver bit and the screw.

SUMMARY

According to an aspect of the present disclosure, a fastening tool includes a bit holding portion configured to hold a driver bit engageable with a screw and that is rotatable in a circumferential direction and movable in an axial direction of the driver bit, a motor configured to rotate the bit holding portion, a controller configured to control the motor, and a detector configured to detect a state of the motor. In a state where the screw engaged with the driver bit is fastened to a fastening target, the controller determines whether the driver bit and the screw are disengaged based on the state of the motor detected by the detector and stops the rotation of the motor in a case where the controller determines that the driver bit and the screw are disengaged.

In the present disclosure, when it is determined that the driver bit and the screw are disengaged, it is determined that the screw is fastened to the fastening target until a head portion of the screw is in the flat state, and the rotation of the motor for rotating the driver bit is stopped.

In the present disclosure, even when the amount of engagement between the driver bit and the screw varies, the rotation of the motor may be stopped at the timing when the screw is fastened to the fastening target until the head portion of the screw is in the flat state.

DESCRIPTION OF EMBODIMENTS

Hereinafter, embodiments of a fastening tool of the present disclosure will be described with reference to the drawings.

Configuration Example of Fastening Tool of The Present Embodiment

Figure 1A:
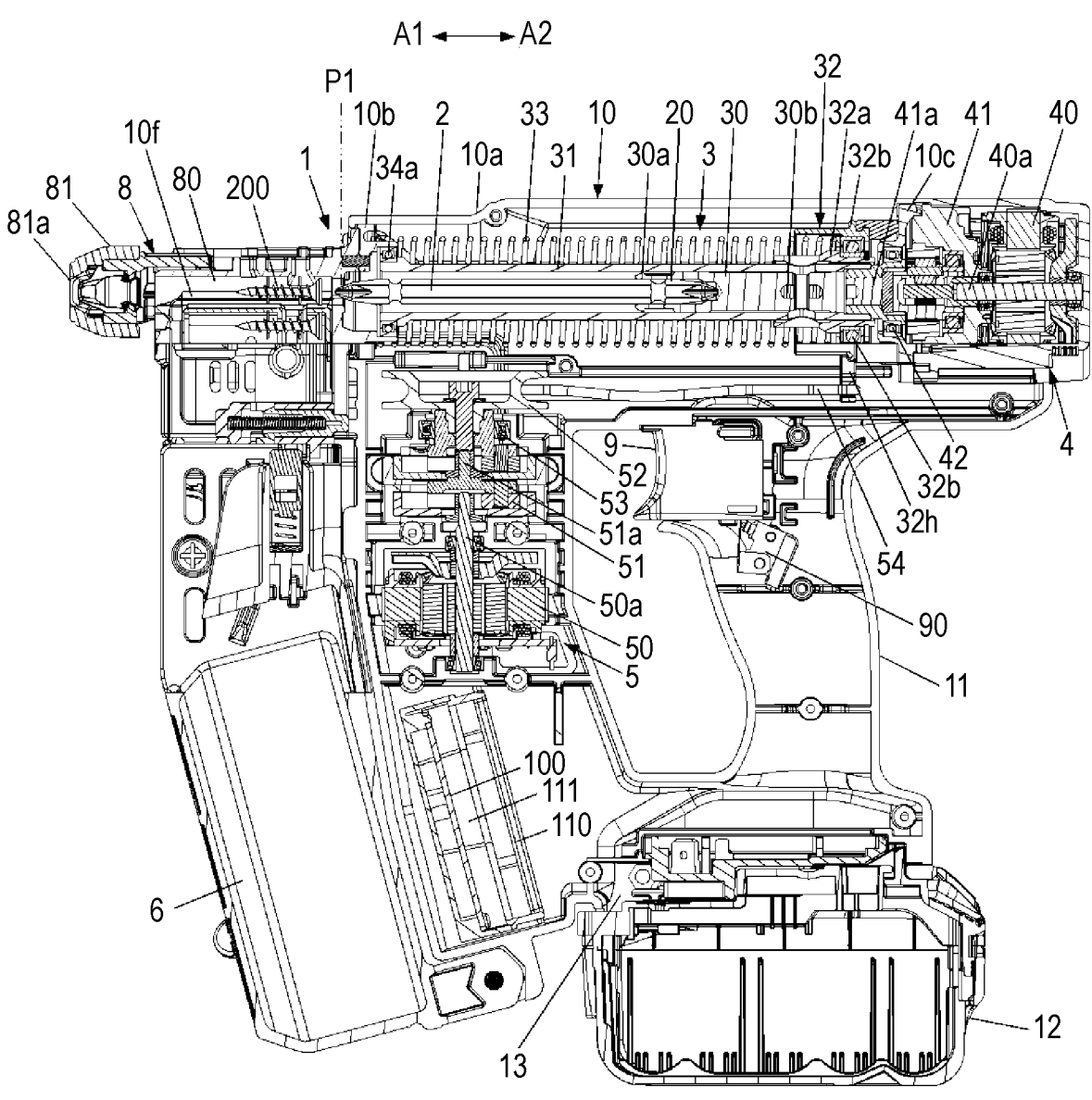
FIG. 1A is a cross-sectional view showing an example of an internal structure of a fastening tool of the present embodiment.
Figure 1B:
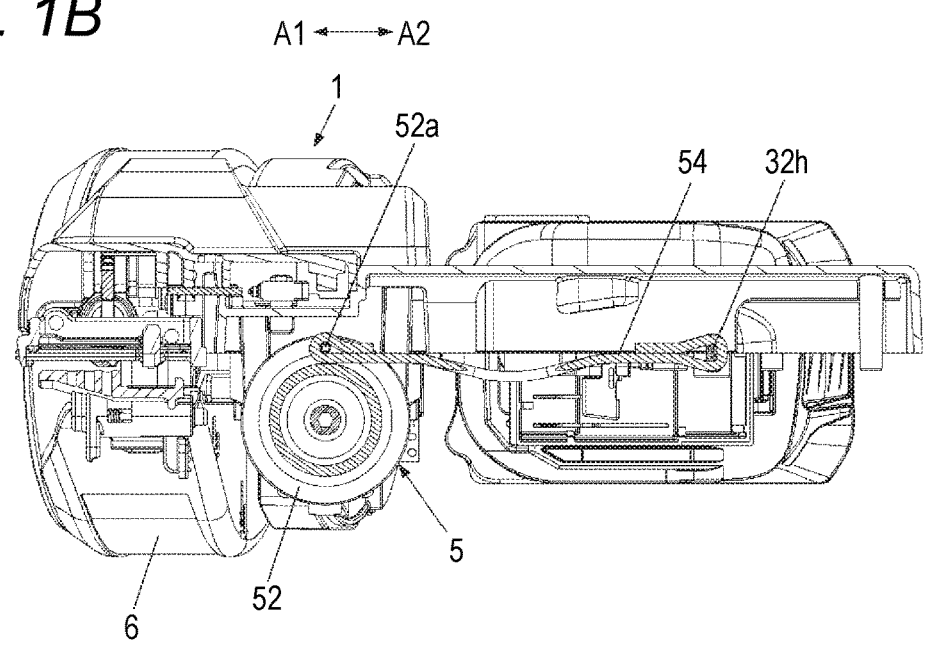
FIG. 1B is a sectional plan view showing an example of the internal structure of the fastening tool of the present embodiment.
Figure 1C:
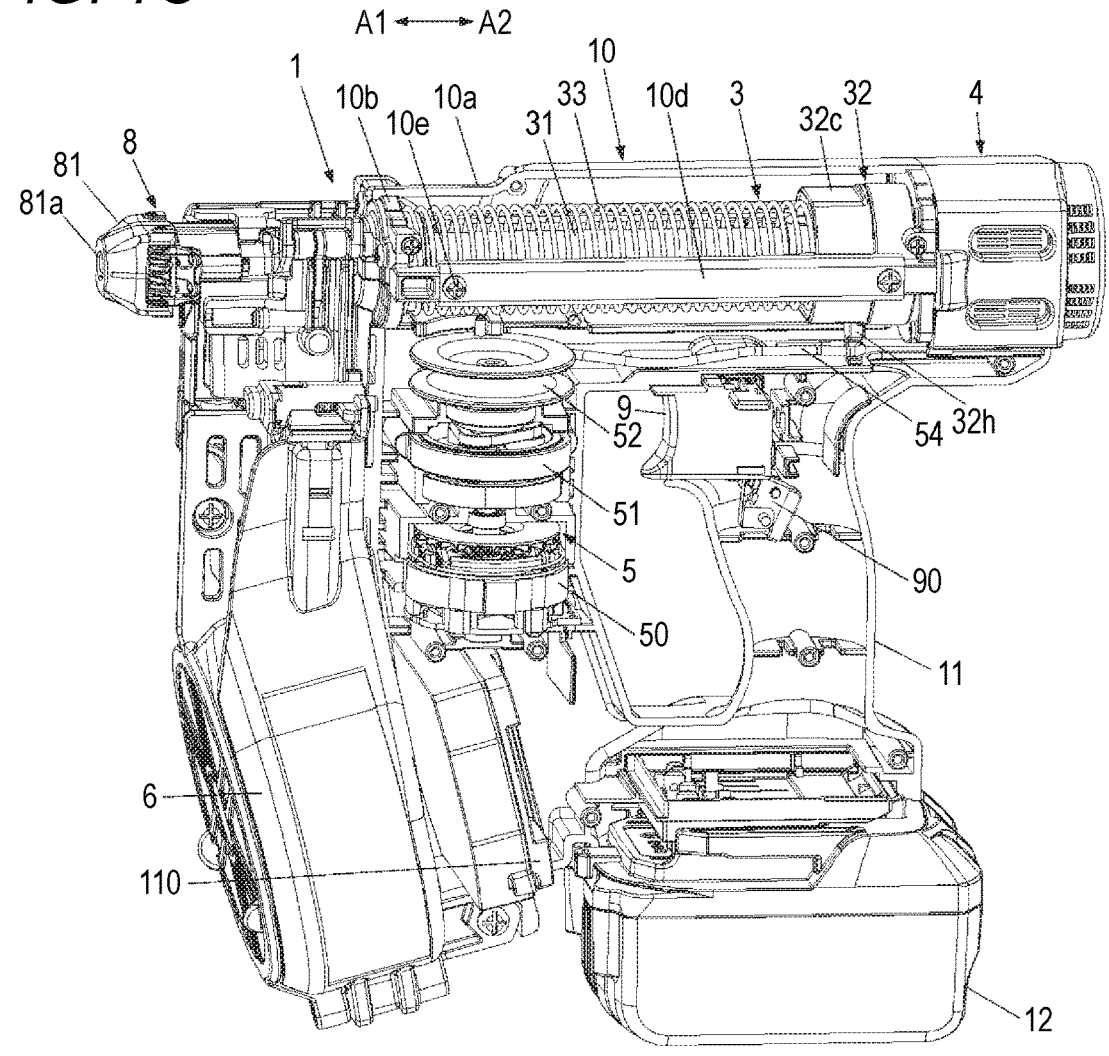
FIG. 1C is an exploded perspective view showing an example of the internal structure of the fastening tool of the present embodiment.

FIG. 1A is a cross-sectional view showing an example of an internal structure of a fastening tool of the present embodiment, FIG. 1B is a sectional plan view showing an example of the internal structure of the fastening tool of the present embodiment, and FIG. 1C is an exploded perspective view showing an example of the internal structure of the fastening tool of the present embodiment.

A fastening tool 1 of the present embodiment includes a bit holding portion 3 that rotatably and movably holds a driver bit 2 engageable with a screw 200 in an axial direction, a first driving portion 4 that rotates the driver bit 2 held by the bit holding portion 3, and a second driving portion 5 that moves the driver bit 2 held by the bit holding portion 3 in the axial direction.

In addition, the fastening tool 1 includes a screw storage portion 6 in which the screw 200 is stored, a screw feed portion 7 described later that feeds the screw stored in the screw storage portion 6, and a nose portion 8 that is pressed against a fastening target into which the screw 200 is fastened and from which the screw 200 is injected.

Further, the fastening tool 1 includes a tool body 10 and a handle 11. The fastening tool 1 also includes a battery attachment portion 13 to which a battery 12 is detachably attached at an end portion of the handle 11.

In the fastening tool 1, the tool body 10 extends in a direction along an axial direction of the driver bit 2 indicated by arrows A1 and A2, and the handle 11 extends in another direction intersecting the extending direction of the tool body 10. In the fastening tool 1, the direction in which the tool body 10 extends, that is, the axial direction of the driver bit 2 indicated by the arrows A1 and A2 is defined as a front-rear direction. In addition, in the fastening tool 1, the direction in which the handle 11 extends is defined as an up-down direction. Further, in the fastening tool 1, a direction orthogonal to the extending direction of the tool body 10 and the extending direction of the handle 11 is defined as a left-right direction.

The first driving portion 4 is provided on a rear side, which is one side of the tool body 10 with respect to the handle 11. The second driving portion 5 is provided on a front side, which is the other side of the tool body 10 with respect to the handle 11.

In the screw storage portion 6, a plurality of screws 200 are connected by a connecting band, and a connection screw wound in a spiral shape is stored.

Figure 2A:
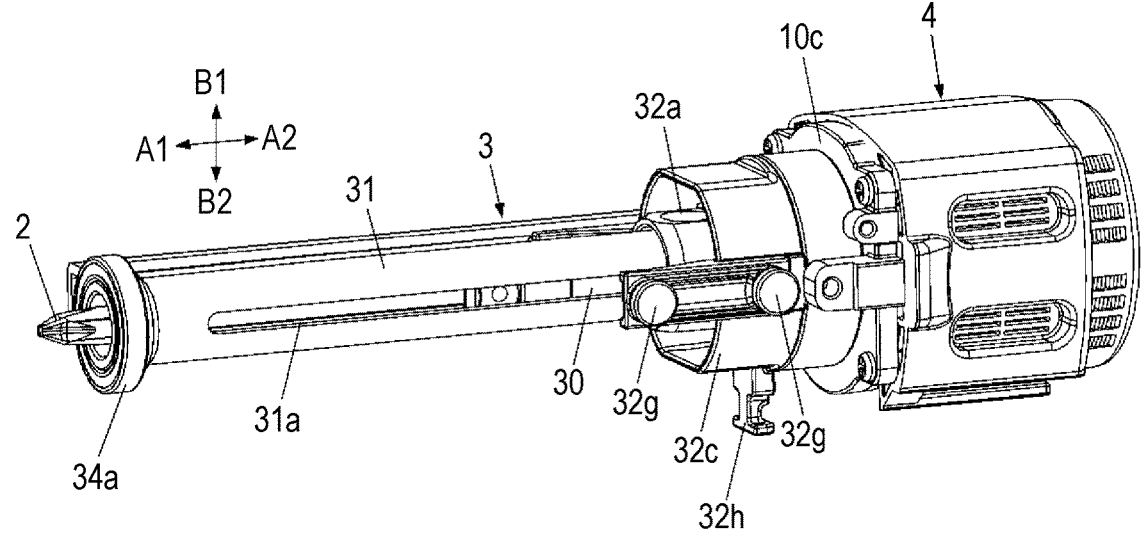
FIG. 2A is a perspective view showing an example of a main part of the configuration of the fastening tool of the present embodiment.
Figure 2B:
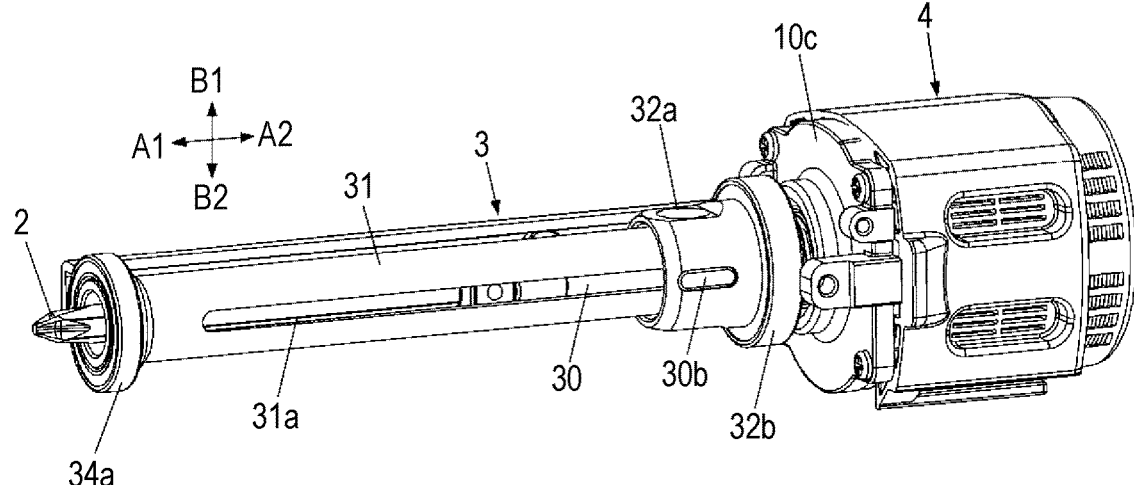
FIG. 2B is a perspective view showing an example of the main part of the configuration of the fastening tool of the present embodiment.
Figure 3A:
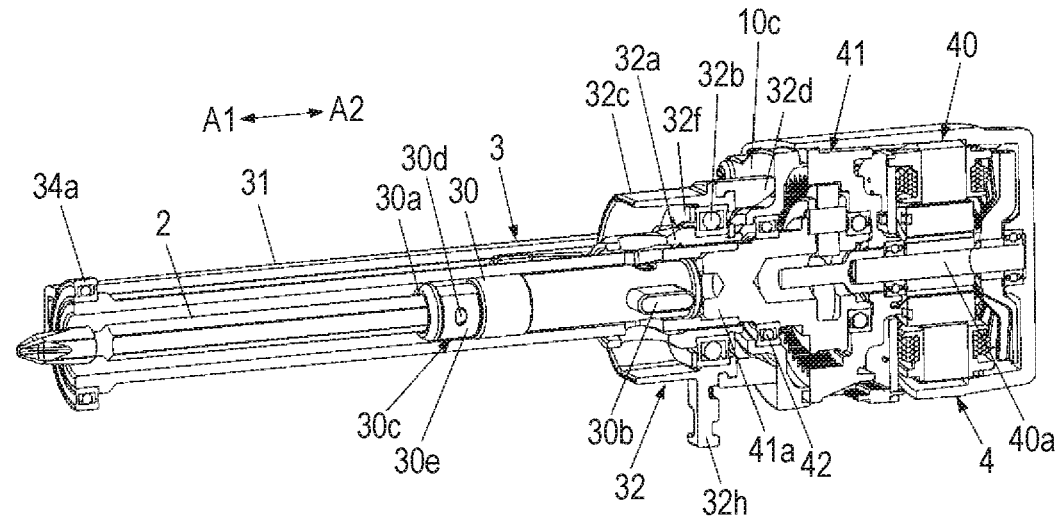
FIG. 3A is a cross-sectional perspective view showing an example of the main part of the configuration of the fastening tool of the present embodiment.
Figure 3B:
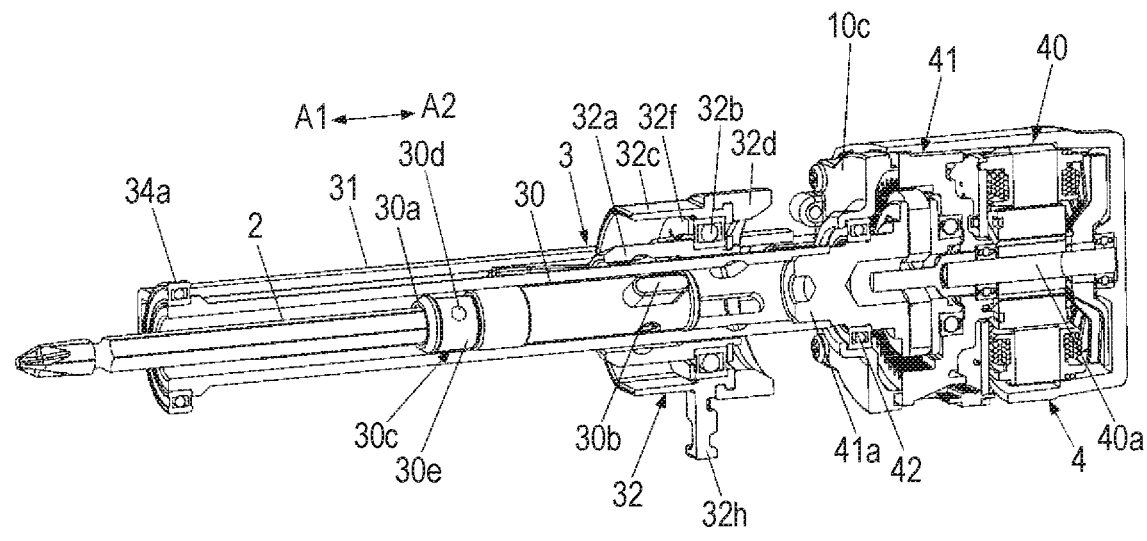
FIG. 3B is a cross-sectional perspective view showing an example of the main part of the configuration of the fastening tool of the present embodiment.

FIGS. 2A and 2B are perspective views showing examples of a main part of the configuration of the fastening tool of the present embodiment, and FIGS. 3A and 3B are cross-sectional perspective views showing examples of the main part of the configuration of the fastening tool of the present embodiment. Next, the bit holding portion 3 and the first driving portion 4 will be described with reference to the drawings.

The bit holding portion 3 includes a holding member 30 that detachably holds the driver bit 2, a rotation guide member 31 that supports the holding member 30 movably in the front-rear direction indicated by the arrows A1 and A2 along the axial direction of the driver bit 2 and rotates together with the holding member 30, a moving member 32 that moves the holding member 30 in the front-rear direction along the rotation guide member 31, and a biasing member 33 that biases the moving member 32 in the rear direction indicated by the arrow A2.

The holding member 30 is formed of, for example, a cylindrical member having an outer diameter slightly smaller than an inner diameter of the rotation guide member 31 and inserted into the rotation guide member 31. In the holding member 30, an opening 30a having a shape matching a cross-sectional shape of the driver bit 2 is provided on a front end portion along the axial direction of the driver bit 2. The holding member 30 includes a detachable holding mechanism 30c that detachably holds the driver bit 2 in the opening 30a. In the holding member 30, the opening 30a is exposed to the inside of the rotation guide member 31, and the driver bit 2 is detachably inserted into the opening 30a.

The detachable holding mechanism 30c includes a ball 30d exposed in the opening 30a and a spring 30e that biases the ball 30d in a direction to which the ball 30d is exposed in the opening 30a. The spring 30e is an annular leaf spring and is fitted to an outer periphery of the holding member 30.

In the detachable holding mechanism 30c, the ball 30d biased by the spring 30e is fitted into a groove portion of the driver bit 2 so that the driver bit 2 is prevented from being carelessly removed from the holding member 30. In addition, when a force equal to or greater than a predetermined force is applied in a direction in which the driver bit 2 is pulled out from the holding member 30, the driver bit 2 may be pulled out from the holding member 30 by retracting the ball 30d while deforming the annular spring 30e.

The rotation guide member 31 extends along the extending direction of the tool body 10, that is, the front-rear direction indicated by the arrows A1 and A2 along the axial direction of the driver bit 2. The rotation guide member 31 has a cylindrical shape in which the holding member 30 is accommodated, and a front end portion is rotatably supported by a front frame 10b provided on a front side of a case 10a constituting an exterior of the tool body 10 via a bearing 34a as an example of a bearing. In addition, a rear end portion of the rotation guide member 31 is connected to the first driving portion 4.

In the rotation guide member 31, groove portions 31a extending in the front-rear direction indicated by the arrows A1 and A2 along the axial direction of the driver bit 2 are formed at two positions of a circumferential surface facing each other in a radial direction. The rotation guide member 31 penetrates the holding member 30 in the radial direction and is connected to the holding member 30 via a connection member 30b protruding from both sides of the holding member 30 by the connection member 30b being inserted in the groove portions 31a.

The connection member 30b is formed of a cylindrical member having an elliptical cross-sectional shape, and a longitudinal direction of the elliptical shape is a direction along an extending direction of the groove portion 31a parallel to the axial direction of the driver bit 2 indicated by the arrows A1 and A2. In addition, a lateral direction of the elliptical shape of the connection member 30b is a direction orthogonal to the extending direction of the groove portion 31a indicated by arrows B1 and B2, that is, a direction along a rotation direction of the rotation guide member 31. A width of the connection member 30b in the lateral direction of the elliptical shape, that is, a width of the rotation guide member 31 along the rotation direction is slightly smaller than a width of the groove portion 31a along the same direction.

Accordingly, the connection member 30b inserted into the groove portions 31a is supported by the groove portions 31a to be movable along the axial direction of the rotation guide member 31. In addition, movement of the connection member 30b along the rotation direction with respect to the rotation guide member 31 is restricted between one side surface and the other side surface of the groove portion 31a extending along the extending direction of the groove portion 31a. Accordingly, when the rotation guide member 31 rotates, the connection member 30b is pressed by one side surface or the other side surface of the groove portion 31a according to the rotation direction of the rotation guide member 31 and receives a force in a circumferential direction, which is the rotation direction, from the rotation guide member 31.

Therefore, when the rotation guide member 31 rotates, the connection member 30b is pressed by the groove portions 31a of the rotation guide member 31, and thus the holding member 30 rotates together with the rotation guide member 31. In addition, the connection member 30b is guided by the groove portions 31a of the rotation guide member 31, and the holding member 30 moves in the front-rear direction along the axial direction of the driver bit 2.

The moving member 32 includes a first moving member 32a that rotates together with the holding member 30 and moves the holding member 30 in the front-rear direction along the rotation guide member 31, a second moving member 32c that is supported by the first moving member 32a via a bearing 32b and presses the first moving member 32a via the bearing 32b, and a buffer member 32d attached to a rear side of the second moving member 32c.

The first moving member 32a is formed of, for example, a cylindrical member having an inner diameter slightly greater than an outer diameter of the rotation guide member 31 and inserted outside the rotation guide member 31. The first moving member 32a is connected to the holding member 30 via the connection member 30b protruding from the groove portion 31a of the rotation guide member 31 and is thereby supported movably along the axial direction of the rotation guide member 31.

The bearing 32b is an example of a bearing and is inserted between an outer periphery of the first moving member 32a and an inner periphery of the second moving member 32c. The first moving member 32a constitutes a bearing inner ring holding member that holds an inner ring of the bearing 32b, and the second moving member 32c constitutes a bearing outer ring holding member that holds an outer ring of the bearing 32b. The inner ring of the bearing 32b is supported on the outer periphery of the first moving member 32a so as not to be movable in the rotation direction and the axial direction, and the outer ring of the bearing 32b is supported on the inner periphery of the second moving member 32c so as not to be movable in the rotation direction and the axial direction.

As a result, the second moving member 32c is connected to the first moving member 32a via the bearing 32b in a state in which the movement in the front-rear direction along the axial direction is restricted. In addition, the second moving member 32c rotatably supports the first moving member 32a via the bearing 32b.

Therefore, when the second moving member 32c moves in the front-rear direction along the axial direction, the first moving member 32a is pressed by the second moving member 32c via the bearing 32b and moves in the front-rear direction along the axial direction together with the second moving member 32c. The first moving member 32a is rotatable with respect to the second moving member 32c which is not rotatable with respect to the rotation guide member 31.

The biasing member 33 is formed of a coil spring in this example, is inserted between the front frame 10b provided on a front side of a case 10a of the tool body 10 and the second moving member 32c of the moving member 32 on an outer side of the rotation guide member 31, and comes into contact with a spring seat 32f disposed to come into contact with an end surface of the outer ring of the bearing 32b. The biasing member 33 is compressed when the moving member 32 moves in the front direction indicated by the arrow A1, and applies a force to the moving member 32 to press the moving member 32 in the rear direction indicated by the arrow A2.

The first driving portion 4 includes a speed reducer 41 and a bit rotation motor 40 driven by electricity supplied from the battery 12. The bit rotation motor 40 is an example of a motor and a first motor, a shaft 40a of the bit rotation motor 40 is connected to the speed reducer 41, and a shaft 41a of the speed reducer 41 is connected to the rotation guide member 31. The first driving portion 4 has a configuration in which the speed reducer 41 uses a planetary gear, and the bit rotation motor 40 is disposed coaxially with the rotation guide member 31, the holding member 30, and the driver bit 2 held by the holding member 30.

In the first driving portion 4, the bit rotation motor 40 and the speed reducer 41 are attached to a rear frame 10c provided on a rear side of the case 10a of the tool body 10, and the shaft 41a of the speed reducer 41 is supported by the rear frame 10c via the bearing 42. The rear end portion of the rotation guide member 31 is connected to the shaft 41a of the speed reducer 41 and the shaft 41a is supported by the rear frame 10c via the bearing 42, and thus the rotation guide member 31 is rotatably supported via the bearing 42, which is an example of a bearing.

The bit holding portion 3 and the first driving portion 4 are integrally assembled by connecting the front frame 10b and the rear frame 10c by a coupling member 10d extending in the front-rear direction, and the front frame 10b is fixed to the case 10a of the tool body 10 by a screw 10e.

In the bit holding portion 3, the front end portion of the rotation guide member 31 is supported by the front frame 10b fixed to the front side of the case 10a of the tool body 10 via the bearing 34a, and the rear end portion of the rotation guide member 31 is supported by the rear frame 10c fixed to the rear side of the case 10a via the shaft 41a of the speed reducer 41 and the bearing 42. Therefore, in the bit holding portion 3, the rotation guide member 31 is rotatably supported by the tool body 10.

Accordingly, the first driving portion 4 causes the bit rotation motor 40 to rotate the rotation guide member 31. When the rotation guide member 31 rotates, the connection member 30b is pressed by the groove portions 31a of the rotation guide member 31, and thus the holding member 30 holding the driver bit 2 rotates together with the rotation guide member 31.

In the bit holding portion 3, guide members 32g are provided on the second moving member 32c. When the guide members 32g are guided by the coupling member 10d, the second moving member 32c is movable in the front-rear direction indicated by the arrows A1 and A2 along the axial direction of the driver bit 2 and is restricted from rotating following the rotation guide member 31.

Next, the second driving portion 5 will be described with reference to the drawings. The second driving portion 5 includes a speed reducer 51 and a bit movement motor 50 driven by the electricity supplied from the battery 12. The bit movement motor 50 is an example of a second motor, a shaft 50*a* of the bit movement motor 50 is connected to the speed reducer 51, and a shaft 51*a* of the speed reducer 51 is connected to a pulley 52, which is an example of a transmission member. In the second driving portion 5, the pulley 52 is supported by the tool body 10 via a bearing 53. In the second driving portion 5, the shaft 50*a* of the bit movement motor 50 is disposed along an extending direction of the handle 11.

In the second driving portion 5, one end of a linear wire 54 as an example of the transmission member is connected to the pulley 52, and the wire 54 is wound around the pulley 52 by rotation of the pulley 52. The other end of the wire 54 is connected to a wire connection portion 32*h* provided on the second moving member 32*c* of the moving member 32.

Accordingly, the second driving portion 5 causes the bit movement motor 50 to rotate the pulley 52 to wind up the wire 54, thereby causing the second moving member 32*c* to move in the front direction indicated by the arrow A1. In the bit holding portion 3, when the second moving member 32*c* moves toward the front direction, the first moving member 32*a* is pressed via the bearing 32*b* and moves toward the front direction along the axial direction together with the second moving member 32*c*. When the first moving member 32*a* moves in the front direction, the holding member 30 connected to the first moving member 32*a* via the connection member 30*b* moves in the front direction, and the driver bit 2 held by the holding member 30 moves in the front direction indicated by the arrow A1.

Therefore, it is possible to control a movement amount of the driver bit 2 attached to the holding member 30 by controlling a rotation amount of the bit movement motor 50. It is also possible to control a movement speed of the driver bit 2 by controlling a rotation speed of the bit movement motor 50.

The wire 54 is flexible enough to be wound around the pulley 52, and cannot thus press the second moving member 32*c* to move the moving member 32 rearward. The biasing member 33 is provided which is compressed when the moving member 32 moves in the front direction indicated by the arrow A1 and applies a force to the moving member 32 to press the moving member 32 in the rear direction indicated by the arrow A2. As a result, the wire 54 is wound by the pulley 52, and the driver bit 2 moves forward so that the driver bit 2 after the forward movement may be moved backward.

Figure 4:
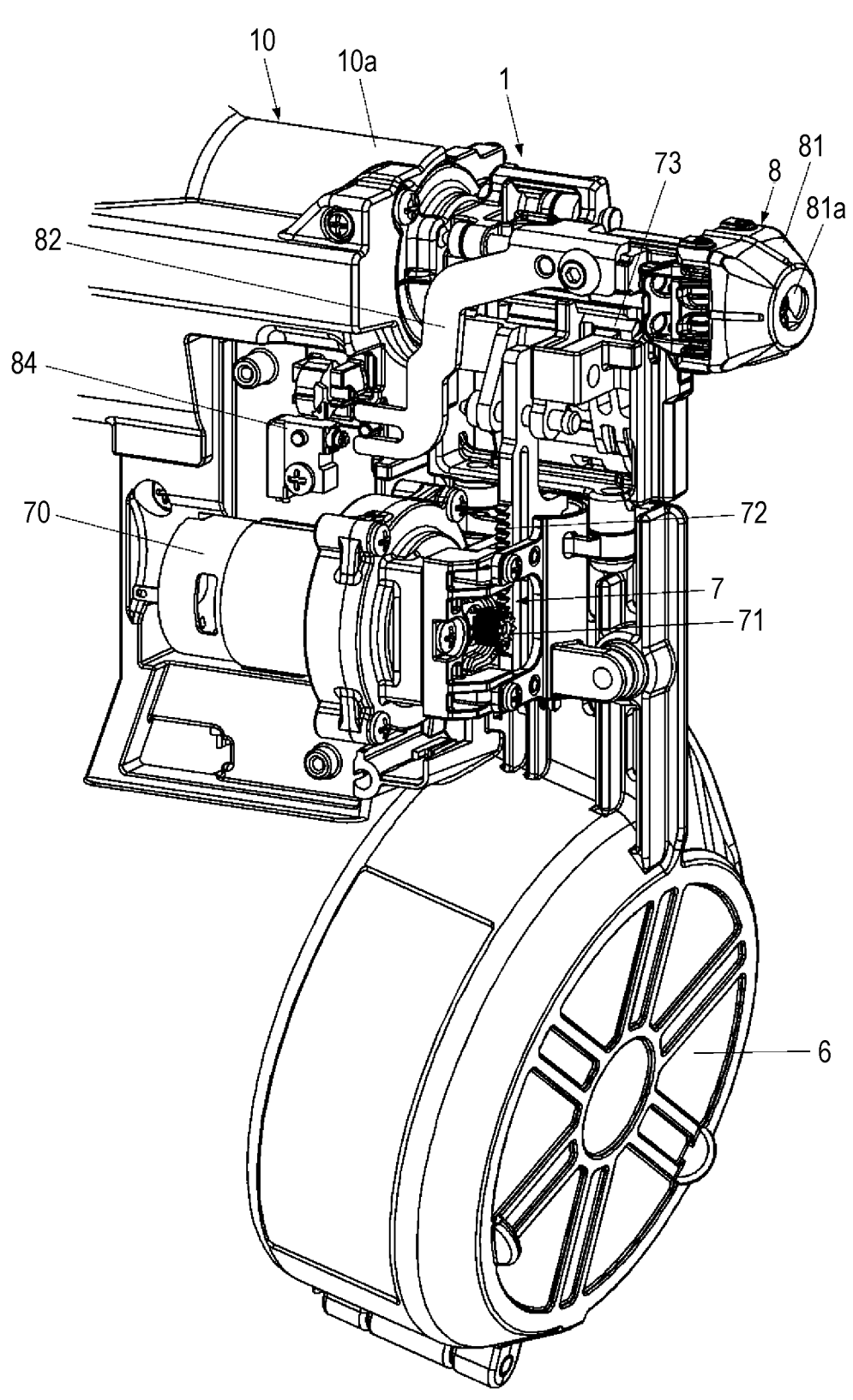
FIG. 4 is a perspective view showing an example of a screw feed portion and a nose portion of the present embodiment.

FIG. 4 is a perspective view showing an example of a screw feed portion and a nose portion according to the present embodiment. Next, the screw feed portion 7 and the nose portion 8 will be described with reference to the drawings. The screw feed portion 7 includes a screw feed motor 70, a pinion gear 71 attached to a shaft of the screw feed motor 70 via a speed reducer, a rack gear 72 engaged with the pinion gear 71, and an engagement portion 73 connected to the rack gear 72 and engaged with the connection screw fed from the screw storage portion 6.

In the screw feed portion 7, the rack gear 72 is supported to be movable in the up-down direction along a feeding direction of the connection screw. In the screw feed portion 7, when the screw feed motor 70 normally and reversely rotates, the engagement portion 73 engaged with the connection screw reciprocates in the up-down direction, and the connection screw is fed. The screw feed portion 7 may reciprocate the engagement portion 73 by a driving portion that linearly moves by a combination of a biasing unit and an electromagnetic force such as a solenoid.

The nose portion 8 includes an injection passage 80 through which the driver bit 2 passes when the screw 200 is supplied from the screw feed portion 7. The nose portion 8 also includes a contact member 81 that has an injection port 81*a* communicating with the injection passage 80 and comes into contact with the fastening target. The nose portion 8 further includes a contact arm 82 that moves in the front-rear direction in conjunction with the contact member 81.

In the nose portion 8, the contact member 81 is movably supported in the front-rear direction indicated by the arrows A1 and A2, and the contact arm 82 moves in the front-rear direction in conjunction with the contact member 81. In the nose portion 8, the contact member 81 is biased to the front direction by a biasing member (not shown), and the contact member 81 which is pressed against the fastening target and moves rearward is biased by the biasing member to move to the front direction.

The fastening tool 1 includes a contact switch portion 84 that operates by being pressed by the contact arm 82. The contact switch portion 84 is pressed by the contact arm 82 in accordance with a position of the contact arm 82 which is moved rearward when the contact member 81 is pressed against the fastening target, whereby presence or absence of the operation is changed. In this example, a state where the contact switch portion 84 is not pressed by the contact arm 82 and is not operated is referred to as an OFF state of the contact switch portion 84, and a state where the contact switch portion 84 is pressed by the contact arm 82 and is operated is referred to as an ON state of the contact switch portion 84.

Figure 5:
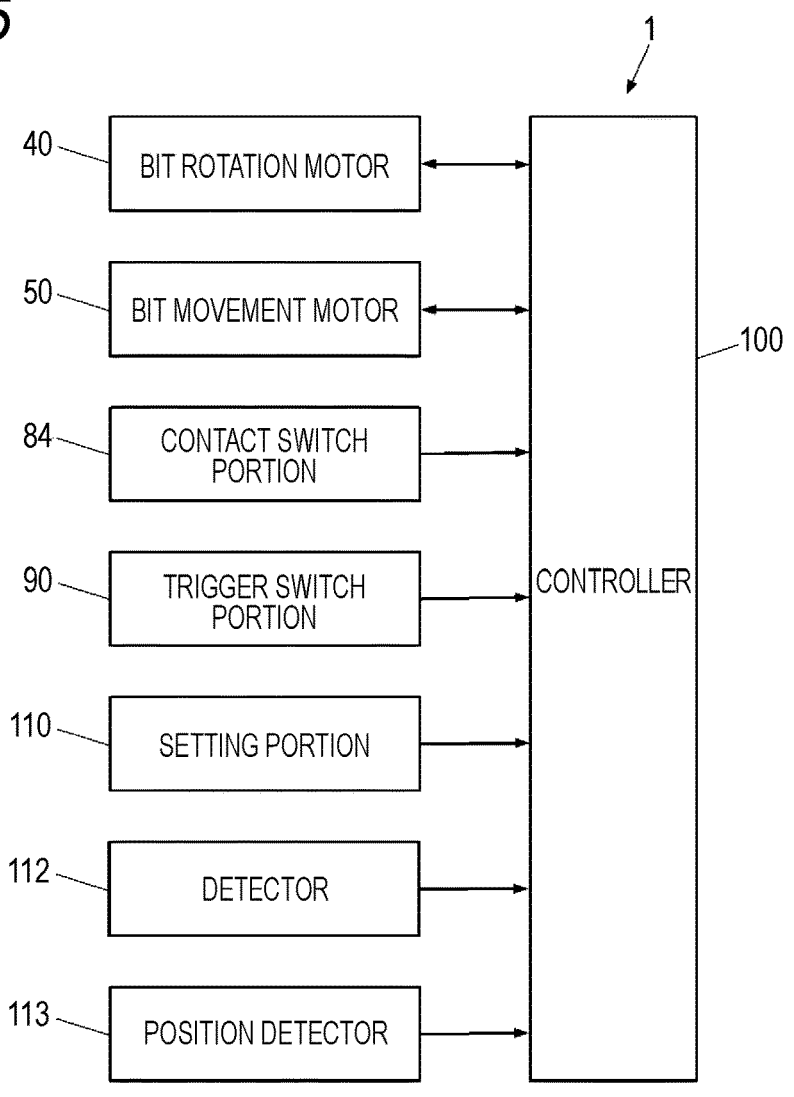
FIG. 5 is a block diagram showing an example of the fastening tool of the present embodiment.

FIG. 5 is a block diagram showing an example of the fastening tool of the present embodiment. Next, a configuration related to control and operation of the fastening tool 1 will be described with reference to the drawings.

The fastening tool 1 includes a trigger 9 that receives an operation and a trigger switch portion 90 that operates in response to the operation of the trigger 9. As shown in FIG. 1A and the like, the trigger 9 is provided on a front side of the handle 11 and is operable by fingers of a hand gripping the handle 11. The trigger switch portion 90 is operated by being pressed by the trigger 9.

The trigger switch portion 90 is pressed by the trigger 9 to switch the presence or absence of the operation, and in this example, a state where the trigger 9 is not operated and the trigger switch portion 90 is not pressed by the trigger 9 and is not operated is referred to as an OFF state of the trigger switch portion 90, and a state where the trigger 9 is operated and the trigger switch portion 90 is pressed by the trigger 9 and is operated is referred to as an ON state of the trigger switch portion 90.

The fastening tool 1 includes a controller 100 that controls the first driving portion 4, the second driving portion 5, and the screw feed portion 7 based on output of the trigger switch portion 90 that is operated by the operation of the trigger 9 and the contact switch portion 84 that is operated by being pressed by the contact member 81. The controller 100 is configured by a substrate on which various electronic components are mounted, and as shown in FIG. 1A, is stored in a substrate storage portion 111 provided on a back side of the screw storage portion 6 between the screw storage portion 6 and the handle 11.

The controller 100 controls whether to drive the bit movement motor 50 of the second driving portion 5 and the bit rotation motor 40 of the first driving portion 4 based on a combination of the ON and the OFF of the contact switch portion 84 and the ON and the OFF of the trigger switch portion 90.

As described above, the fastening tool 1 includes the first driving portion 4 which rotates the driver bit 2 held by the holding member 30 in the bit holding portion 3 by the driving of the bit rotation motor 40. The fastening tool 1 also includes the second driving portion 5 which moves the driver bit 2 held by the holding member 30 in the bit holding portion 3 in the front-rear direction along the axial direction by the driving of the bit movement motor 50.

In the fastening tool 1, when the bit movement motor 50 rotates in a predetermined direction, the driver bit 2 held by the holding member 30 in the bit holding portion 3 moves in the front direction indicated by the arrow A1 (moves forward). In the fastening tool 1, when the bit rotation motor 40 rotates in a predetermined direction, the driver bit 2 rotates in a direction in which the screw 200 is fastened.

The fastening tool 1 moves the driver bit 2 forward by the rotation of the bit movement motor 50 to engage the driver bit 2 with the recess of the screw 200, and moves the screw 200 in the front direction to press the screw 200 against the fastening target.

In addition, the fastening tool 1 rotates the driver bit 2 by the rotation of the bit rotation motor 40 in a direction in which the screw 200 is fastened to fasten the screw 200 engaged with the driver bit 2 to the fastening target.

Further, the fastening tool 1 rotates the bit movement motor 50 in conjunction with the rotation of the bit rotation motor 40 to move the driver bit 2 forward following the fastening of the screw 200.

Therefore, the controller 100 controls the movement amount (forward movement amount) of the driver bit 2 by controlling the rotation amount of the bit movement motor 50. The controller 100 controls a stop position along the axial direction of the driver bit 2 by controlling the movement amount of the driver bit 2.

In addition, the controller 100 controls a rotation speed of the bit rotation motor 40 and the rotation speed of the bit movement motor 50 to move the driver bit 2 forward following the fastening of the screw 200.

Further, the controller 100 determines, based on the state of the bit rotation motor 40, whether the driver bit 2 and the screw 200 are engaged with each other, and controls a timing at which the rotation of the bit rotation motor 40 is stopped.

Therefore, the fastening tool 1 includes a detector 112 that detects, during the operation of the bit rotation motor 40, a state of the bit rotation motor 40 for determining whether the driver bit 2 and the screw 200 are disengaged.

Specifically, the detector 112 detects, as the state of the bit rotation motor, whether a load applied to the bit rotation motor 40 becomes a load corresponding to the disengagement between the driver bit 2 and the screw 200. The detector 112 may detects a current value, the rotation speed, or a voltage value of the bit rotation motor 40. The detector 112 detects whether the load applied to the bit rotation motor 40 becomes the load corresponding to the disengagement between the driver bit 2 and the screw 200, based on, for example, the current value flowing through the bit rotation motor 40 or the voltage value applied to the bit rotation motor 40 that changes according to the current flowing through the bit rotation motor 40. The detector 112 detects whether the load applied to the bit rotation motor 40 becomes the load corresponding to the disengagement between the driver bit 2 and the screw 200, based on the rotation speed of the bit rotation motor 40. The function of the detector 112 may be implemented by the controller 100. The detector 112 may detect the rotation amount of the bit rotation motor 40, and the controller 100 may determine whether the driver bit 2 and the screw 200 are disengaged based on the rotation amount of the bit rotation motor 40 detected by the detector 112. The detector 112 may detect a drive duration time of the bit rotation motor 40, and the controller 100 may determine whether the driver bit 2 and the screw 200 are disengaged based on the drive duration time of the bit rotation motor 40 detected by the detector 112.

The controller 100 stops the rotation of the bit rotation motor 40 when determining that the driver bit 2 and the screw 200 are disengaged based on the state of the bit rotation motor 40 detected by the detector 112 in the operation of rotating the bit rotation motor 40 in the direction in which the screw 200 engaged with the driver bit 2 held by the holding member 30 in the bit holding portion 3 is fastened to the fastening target.

In addition, when the controller 100 controls the position along the axial direction of the bit holding portion 3 by the rotation amount of the bit movement motor 50 and determines that the bit holding portion 3 moves to a stop determination allowable position at which the detection of the disengagement between the driver bit 2 and the screw 200 is permitted, the controller 100 determines whether the driver bit 2 and the screw 200 are disengaged based on the state of the bit rotation motor 40 detected by the detector 112.

Therefore, the fastening tool 1 includes a position detector 113 that detects a position along the axial direction of the driver bit 2 (position of the holding member 30). The position detector 113 detects, for example, the rotation amount of the bit movement motor 50 and detects the position of the driver bit 2 (position of the holding member 30) based on the rotation amount of the bit movement motor 50. The controller 100 determines whether the driver bit 2 (holding member 30) moves to a predetermined stop determination allowable position (forward movement end position) based on the position of the driver bit 2 (position of the holding member 30) detected by the position detector 113. The function of the position detector 113 may be implemented by the controller 100.

Therefore, when the driver bit 2 and the screw 200 are disengaged while the screw 200 is being fastened to the fastening target, the disengagement is determined based on the state of the bit rotation motor 40 detected by the detector 112, and thus the rotation of the bit rotation motor 40 is prevented from being stopped.

Figure 6:
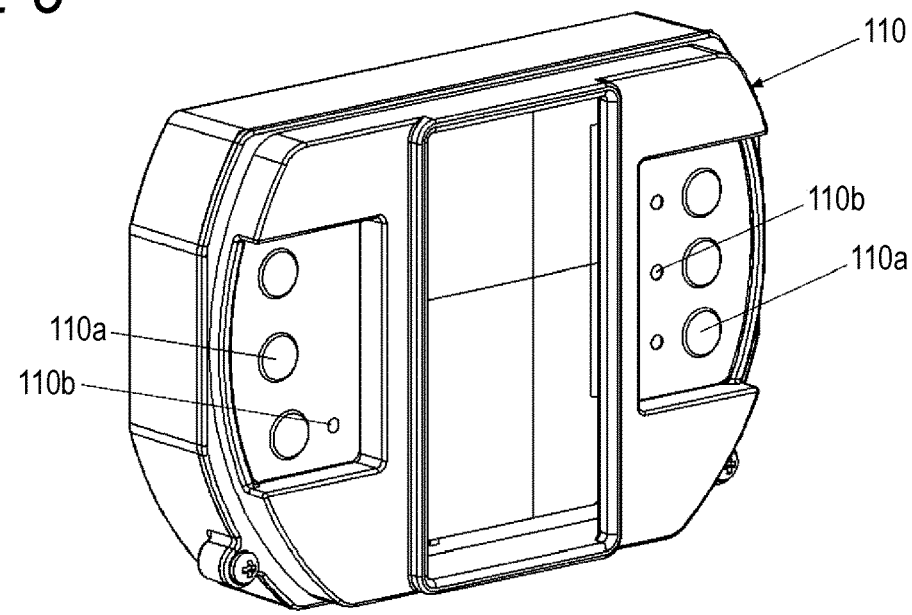
FIG. 6 is a perspective view showing an example of a setting portion.

The fastening tool 1 includes a setting portion 110 in which the rotation amount or the like of the bit movement motor 50, which defines the forward movement amount of the driver bit 2, is set. FIG. 6 is a perspective view showing an example of a setting portion. Next, the setting portion 110 will be described with reference to the drawings.

The setting portion 110 is an example of a setting unit and may select any setting value from a plurality of setting values or any setting value continuously.

In this example, in the setting portion 110, the setting value is selected by an operation portion 110*a* configured by a button. In the operation portion 110*a*, the setting value may be selected by a rotary dial. The setting portion 110 may display the selected setting value by a method of indicating a current value with a label, a mark, or the like, a method of indicating the current value on a display portion 110*b* such as an LED, or the like so that an operator may easily grasp a current setting value. Contents displayed on the display portion 110*b* include, in addition to a setting value of a screw depth defined by the forward movement amount of the driver bit 2, an ON/OFF state of a power supply, an operation mode selected from various selectable operation modes, presence or absence of the screw, a remaining amount of the screw, and presence or absence of an abnormality.

The setting portions 110 are provided on both left and right sides of a surface facing the handle 11 in the substrate storage portion 111 provided on the back side of the screw storage portion 6.

Accordingly, when the fastening tool 1 is viewed from the rear, the setting portions 110 may be visually recognized from both the left and right sides of the handle 11.

Operation Example of Fastening Tool of the Present Embodiment

Figure 7:
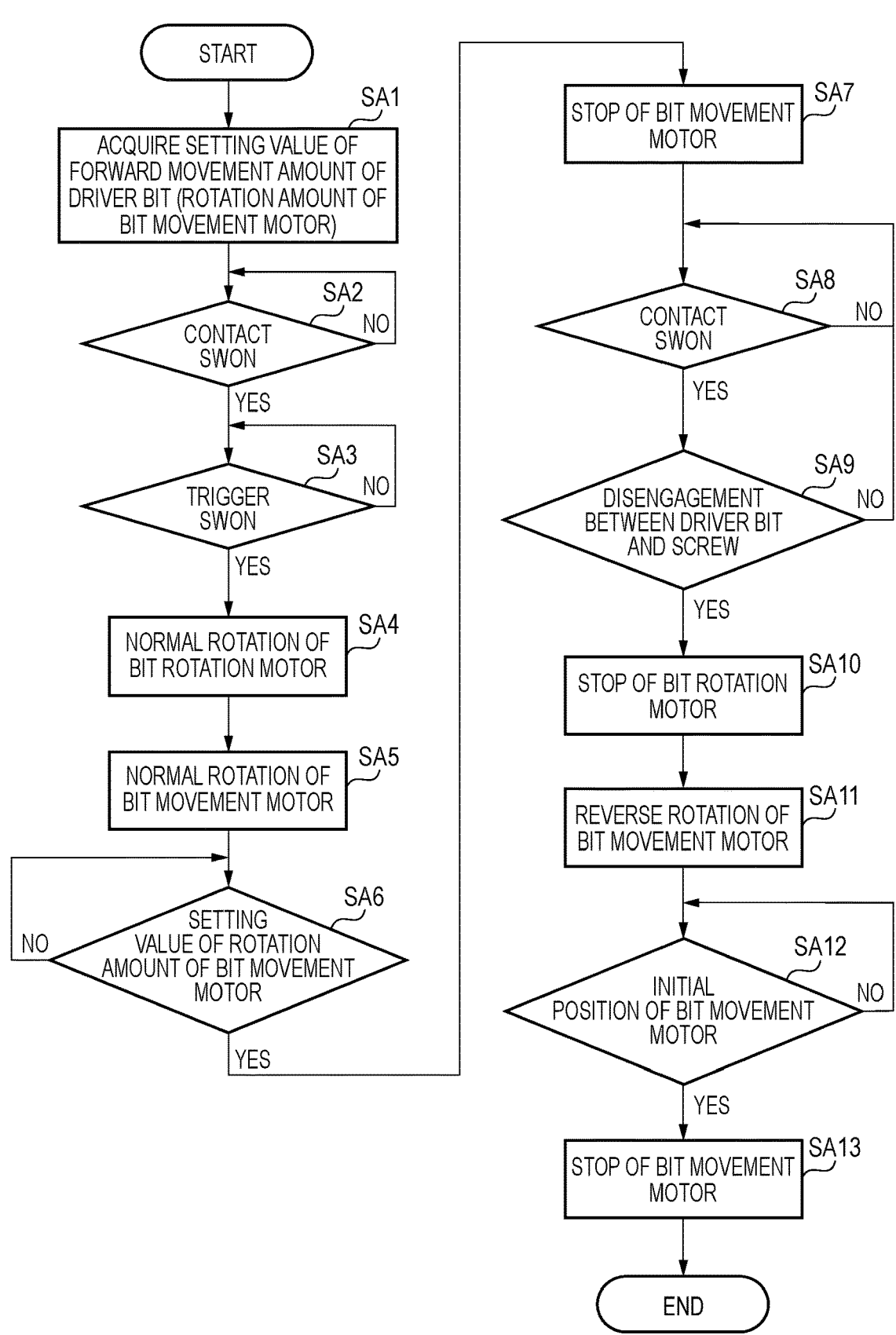
FIG. 7 is a flowchart showing an example of an operation of the fastening tool of the present embodiment.
Figure 8A:
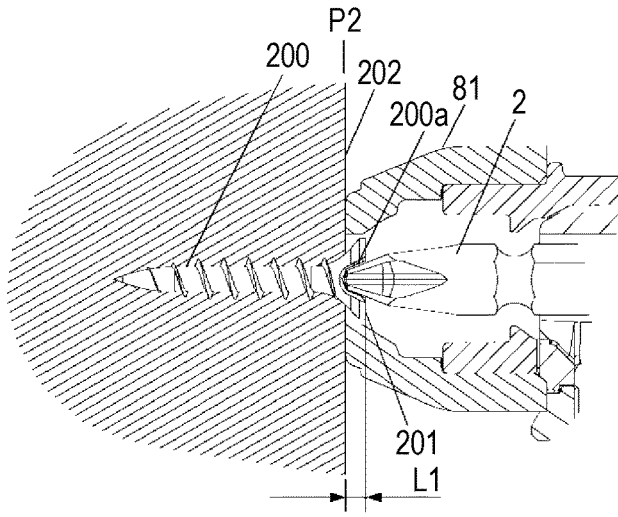
FIG. 8A is a cross-sectional view showing a fastened state of a screw.
Figure 8B:
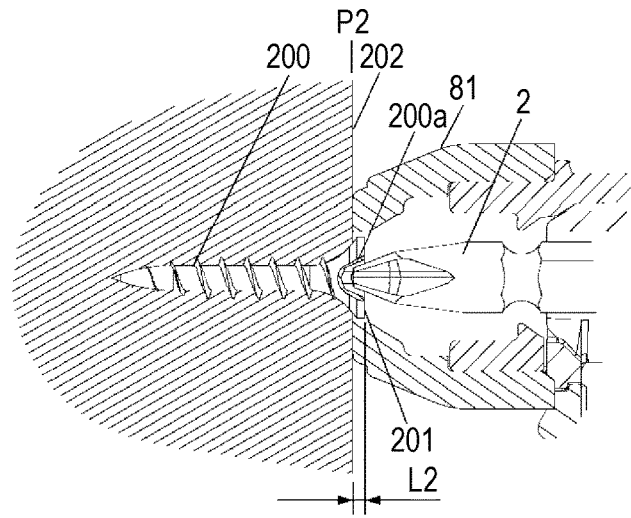
FIG. 8B is a cross-sectional view showing the fastened state of the screw.
Figure 8C:
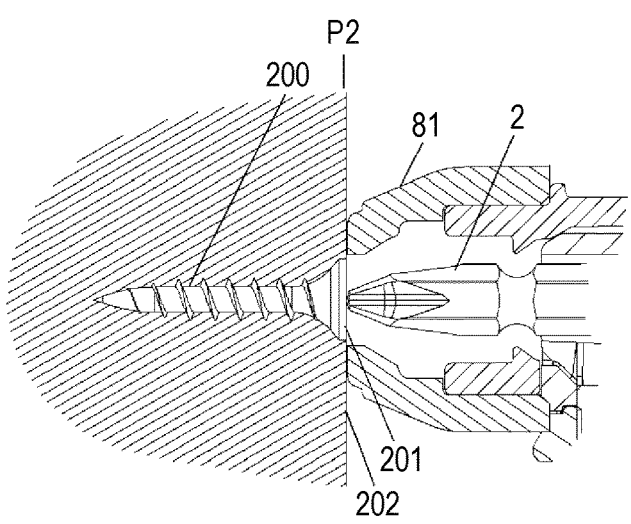
FIG. 8C is a cross-sectional view showing the fastened state of the screw.
Figure 9A:
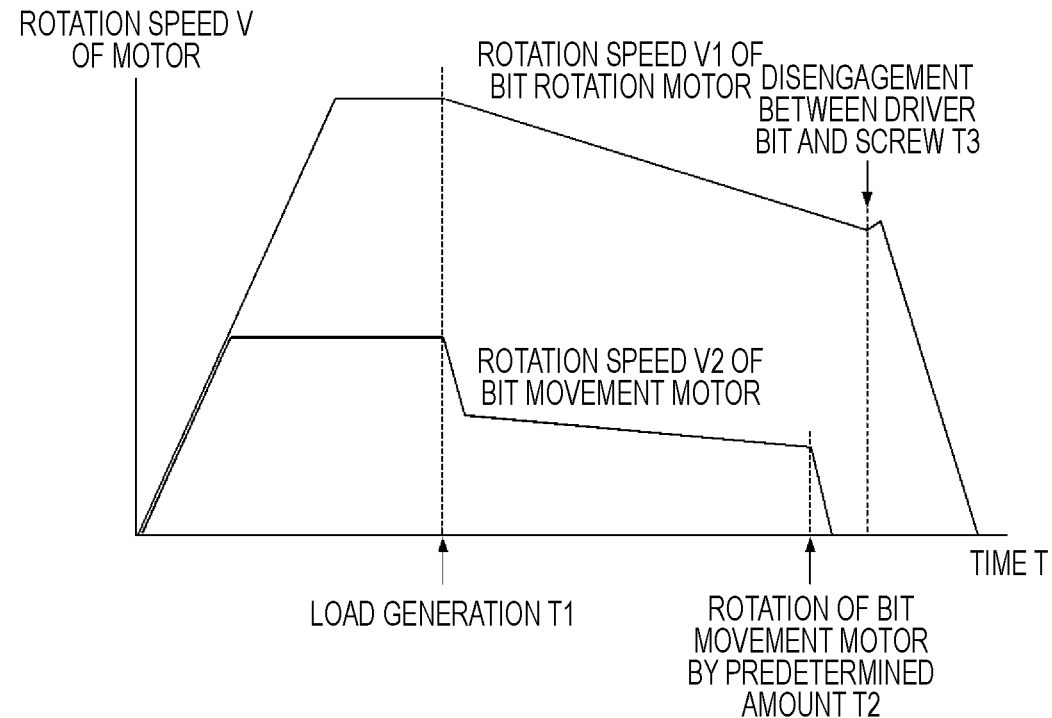
FIG. 9A is a graph showing a relation between rotation speeds of a bit rotation motor and a bit movement motor.
Figure 9B:
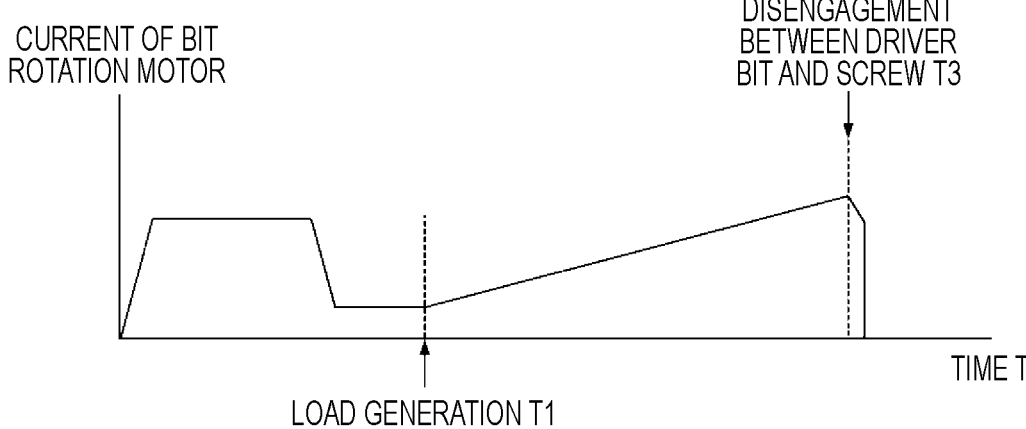
FIG. 9B is a graph showing a current change in the bit rotation motor.

FIG. 7 is a flowchart showing an example of an operation of the fastening tool of the present embodiment, FIGS. 8A, 8B, and 8C are cross-sectional views showing a fastened state of the screw, FIG. 9A is a graph showing a relation between the rotation speeds of the bit rotation motor and the bit movement motor, and FIG. 9B is a graph showing a current change of the bit rotation motor. Next, a fastening operation of the fastening tool of the present embodiment will be described with reference to the drawings.

In a standby state of the fastening tool 1, as shown in FIG. 1A, a tip of the driver bit 2 is positioned at a standby position P1 behind the injection passage 80, and the screw 200 may be supplied to the injection passage 80.

In step SA1 of FIG. 7, the controller 100 sets the rotation amount of the bit movement motor 50, which defines the forward movement amount of the driver bit 2, based on the setting value selected by the setting portion 110. When the contact member 81 is pressed against a fastening target 202, the contact switch portion 84 is pressed by the contact arm 82 and is in the ON state in step SA2, the trigger 9 is operated, and the trigger switch portion 90 is in the ON state in step SA3, the controller 100 drives the bit rotation motor 40 of the first driving portion 4 in step SA4 and drives the bit movement motor 50 of the second driving portion 5 in step SA5.

When the bit movement motor 50 is driven to rotate in a forward direction, which is one direction, the pulley 52 rotates in the forward direction so that the wire 54 is wound around the pulley 52. When the wire 54 is wound around the pulley 52, the second moving member 32c connected to the wire 54 is guided by the rotation guide member 31 and moves in the front direction along the axial direction. When the second moving member 32c moves in the front direction, the first moving member 32a is pressed to the second moving member 32c via the bearing 32b and moves in the front direction along the axial direction while compressing the biasing member 33 together with the second moving member 32c.

When the first moving member 32a moves in the front direction, the holding member 30 connected to the first moving member 32a by the connection member 30b moves in the front direction along the axial direction of the driver bit 2 while the connection member 30b is guided by the groove portion 31a of the rotation guide member 31.

Accordingly, the driver bit 2 held by the holding member 30 moves in the front direction indicated by the arrow A1, engages with the screw 200 supplied to the injection port 81a of the nose portion 8 to move the screw 200 in the front direction and press the screw 200 against the fastening target 202.

When the bit rotation motor 40 is driven to rotate in the forward direction, the rotation guide member 31 rotates in the forward direction. When the rotation guide member 31 rotates in the forward direction, the connection member 30b connected to the holding member 30 is pressed to the groove portion 31a of the rotation guide member 31 so that the holding member 30 rotates together with the rotation guide member 31.

Accordingly, the driver bit 2 held by the holding member 30 rotates the screw 200 in the forward direction (clockwise) to fasten the screw 200 to the fastening target 202. When the operation of rotating the driver bit 2 to fasten the screw 200 to the fastening target 202 is started, the fastening tool 1 generates a load applied to the driver bit 2 via the screw 200. After a timing T1 at which the load is generated by screw fastening, a rotation speed V1 of the bit rotation motor 40 and a rotation speed V2 of the bit movement motor 50 both decrease.

When it is determined that the rotation amount of the bit movement motor 50 becomes the setting value selected by the setting portion 110 in step SA6 and the tip of the driver bit 2 reaches a set forward movement end position P2 at a timing T2 as shown in FIGS. 8A and 8B, the controller 100 stops the rotation of the bit movement motor 50 in the forward direction in step SA7.

When the contact switch portion 84 is in the ON state in step SA8, the controller 100 continues to rotate the bit rotation motor 40 in the forward direction. After stopping the rotation of the bit movement motor 50, the controller 100 determines in step SA9 whether the driver bit 2 held by the bit holding portion 3 and rotated by the bit rotation motor 40 and the screw 200 are disengaged based on the state of the bit rotation motor 40 detected by the detector 112.

When determining that the driver bit 2 and the screw 200 are disengaged based on the state of the bit rotation motor 40 detected by the detector 112 in the operation of rotating the bit rotation motor 40 in the direction in which the screw 200 engaged with the driver bit 2 held by the holding member 30 in the bit holding portion 3 is fastened to the fastening target 202, the controller 100 stops the driving of the bit rotation motor 40 in step SA10, and then reversely rotates the bit movement motor 50 in step SA11.

When the bit movement motor 50 rotates in the reverse direction, which is the other direction, the pulley 52 rotates in the reverse direction so that the wire 54 is pulled out from the pulley 52. When the wire 54 is pulled out from the pulley 52, the biasing member 33 compressed by the movement in the front direction of the second moving member 32c extends and presses the second moving member 32c in the rear direction.

When being pressed in the rear direction by the biasing member 33, the second moving member 32c is guided by the rotation guide member 31 and moves in the rear direction along the axial direction. When the second moving member 32c moves in the rear direction, the first moving member 32a is pulled by the second moving member 32c via the bearing 32b and moves together with the second moving member 32c in the rear direction along the axial direction.

When the first moving member 32a moves in the rear direction, the holding member 30 connected to the first moving member 32a by the connection member 30b moves in the rear direction along the axial direction of the driver bit 2 while the connection member 30b is guided by the groove portion 31a of the rotation guide member 31.

When the bit movement motor 50 reversely rotates to an initial position at which the wire 54 is pulled out from the pulley 52 by a predetermined amount, and the holding member 30 and the moving member 32 move in the rear direction to a position at which the tip of the driver bit 2 returns to the standby position P1 in step SA12, the controller 100 stops the reverse rotation of the bit movement motor 50 in step SA13.

When the trigger switch portion 90 is in the OFF state, the controller 100 rotates the screw feed motor 70 in a direction to lower the engagement portion 73. When the engagement portion 73 is lowered to a position at which the engagement portion 73 engages with a next screw 200, the controller 100 reversely rotates the screw feed motor 70 to raise the engagement portion 73 and supply the next screw 200 to the injection passage 80. Before the trigger switch portion 90 is in the OFF state, while the fastening operation of the screw 200 is being executed, the engagement portion 73 may be lowered to the position at which the engagement portion 73 is engaged with the next screw 200 and put on standby. As a result, it is possible to shorten the time until the next screw 200 may be supplied to the injection passage 80.

When the driver bit 2 is engaged with the recess 200a of the screw 200 and is rotated to fasten the screw 200, since the recess 200a of the screw 200 and the driver bit 2 are in contact with each other at an inclined surface, a part of the rotation torque acts as a force in a direction for floating the driver bit 2 from the screw 200, and when a pressing force of the operator pressing the fastening tool 1 in the direction of the fastening target 202 is small, the recess 200a of the screw 200 and the tip of the driver bit 2 may not come into close contact with each other.

Therefore, an amount of engagement between the driver bit 2 and the recess 200a of the screw 200 may vary in the operation of fastening the screw 200 by the driver bit 2.

Here, a position of the tip of the driver bit 2 at which a head portion 201 of the screw 200 is in a state of floating from the fastening target 202 is referred to as the forward movement end position P2. In this way, the tip of the driver bit 2 reaches the forward movement end position P2 to stop the normal rotation of the bit movement motor 50, and after the forward movement of the driver bit 2 ends, the head portion 201 of the screw 200 is still in the state of floating from the fastening target 202, and the normal rotation of the bit rotation motor 40 is continued, whereby the screw 200 is further fastened to the fastening target 202.

When the screw 200 is fastened to the fastening target 202 until the screw 200 is in a so-called flat state in which the head portion 201 of the screw 200 is not floated from or buried in the surface of the fastening target 202, a so-called come-out state occurs in which the driver bit 2 and the recess 200a of the screw 200 are disengaged.

Accordingly, when it is detected that the driver bit 2 and the screw 200 are disengaged, it is possible to determine that the screw 200 is fastened to the fastening target 202 until the head portion 201 of the screw 200 is in the flat state.

As shown in FIGS. 8A and 8B, when amounts of engagement L1 and L2 between the driver bit 2 and the recess 200a of the screw 200 varies, the fastening depth of the screw 200 is not constant when the tip of the driver bit 2 reaches the forward movement end position P2.

On the other hand, the controller 100 rotates the bit rotation motor 40 until the driver bit 2 and the screw 200 are disengaged after the tip of the driver bit 2 reaches the forward movement end position P2, and stops the driving of the bit rotation motor 40 when determining that the driver bit 2 and the screw 200 are disengaged based on the state of the bit rotation motor 40 detected by the detector 112.

Accordingly, the fastening depth of the screw 200 is determined at a position at which the driver bit 2 and the recess 200a of the screw 200 are disengaged regardless of the amount of engagement between the driver bit 2 and the recess 200a of the screw 200. Therefore, as shown in FIG. 8C, at a timing when the screw 200 is fastened to the fastening target 202 until the head portion 201 of the screw 200 is in the flat state, the rotation of the bit rotation motor 40 may be stopped, and the fastening depth of the screw may be accurately managed.

The controller 100 determines that the driver bit 2 and the screw 200 are disengaged based on, for example, a change in the rotation speed of the bit rotation motor 40 detected by the detector 112. While the screw 200 is fastened to the fastening target 202, a load continues to be normally applied to the bit rotation motor 40, and thus the rotation speed V1 of the bit rotation motor 40 gradually decreases as illustrated in FIG. 9A. In contrast, when the driver bit 2 and the screw 200 are disengaged, since the rotation speed increases as the load applied to the bit rotation motor 40 decreases, the so-called come-out is determined by detecting an increase in the rotation speed of the bit rotation motor 40. For example, during the operation of rotating the bit rotation motor 40, it is determined that the driver bit 2 and the screw 200 are disengaged at a timing T3 at which the rotation speed of the bit rotation motor 40 increases. In addition, when the driver bit 2 and the screw 200 are disengaged, the driver bit 2 is in an idling state (a no-load state or a state close to the no-load state). Therefore, when the rotation speed of the bit rotation motor 40 reaches a rotation speed equivalent to that when the driver bit 2 is idling, it may be determined that the driver bit 2 and the screw 200 are disengaged.

The disengagement between the driver bit 2 and the screw 200 may be determined by detecting a change in the current value or the voltage value flowing through the bit rotation motor 40. When the driver bit 2 and the screw 200 are disengaged, the load applied to the bit rotation motor 40 decreases so that the current flowing through the bit rotation motor 40 decreases. Here, during the operation of rotating the bit rotation motor 40, as shown in FIG. 9B, it may be determined that the driver bit 2 and the screw 200 are disengaged at the timing T3 at which the current flowing through the bit rotation motor 40 decreases. When the driver bit 2 and the screw 200 are disengaged, the load applied to the bit rotation motor 40 decreases so that a voltage applied to the bit rotation motor 40 increases. Here, during the operation of rotating the bit rotation motor 40, it may be determined that the driver bit 2 and the screw 200 are disengaged at a timing at which the voltage applied to the bit rotation motor 40 increases. Further, when the driver bit 2 and the screw 200 are disengaged, the driver bit 2 is in the idling state (the no-load state or the state close to the no-load state). Therefore, when the current value and the voltage value of the bit rotation motor 40 reach a current value and a voltage value equivalent to those when the driver bit 2 is idling, it may be determined that the driver bit 2 and the screw 200 are disengaged.

When the rotation of the bit rotation motor 40 continues in a state where the come-out occurs, the operator feels uncomfortable due to wear of the driver bit 2 and a sound during the come-out, and thus it is desirable to detect the come-out in a short time and stop the rotation of the bit rotation motor 40. When a threshold value of a rotation speed increase amount for detecting the come-out is set to be small, the come-out may be detected in a short time. However, when the threshold value of the rotation speed increase amount is set to be small, erroneous detection is likely to occur.

Therefore, by setting a timing at which the come-out is detected, the occurrence of the erroneous detection is avoided. The timing of detecting the come-out may prevent the occurrence of the erroneous detection under any condition, for example, after it is detected that the load applied to the bit rotation motor 40 is equal to or greater than a load for fastening the screw 200, after the position of the driver bit 2 (holding member 30) in the axial direction moves forward to the stop determination allowable position at which the detection of the come-out is allowable, or that the contact switch portion 84 is ON. The stop determination allowable position may be the forward movement end position P2. Further, in addition to any condition described above, the occurrence of the erroneous detection may be further prevented by adding a condition at which the detection of the come-out is prevented when the bit rotation motor 40 rotates only by a rotation amount in which the come-out cannot occur and the detection of the come-out is allowed after the rotation amount of the bit rotation motor 40 reaches the stop determination allowable rotation amount in which the detection of the come-out is allowed.

Figure 10:
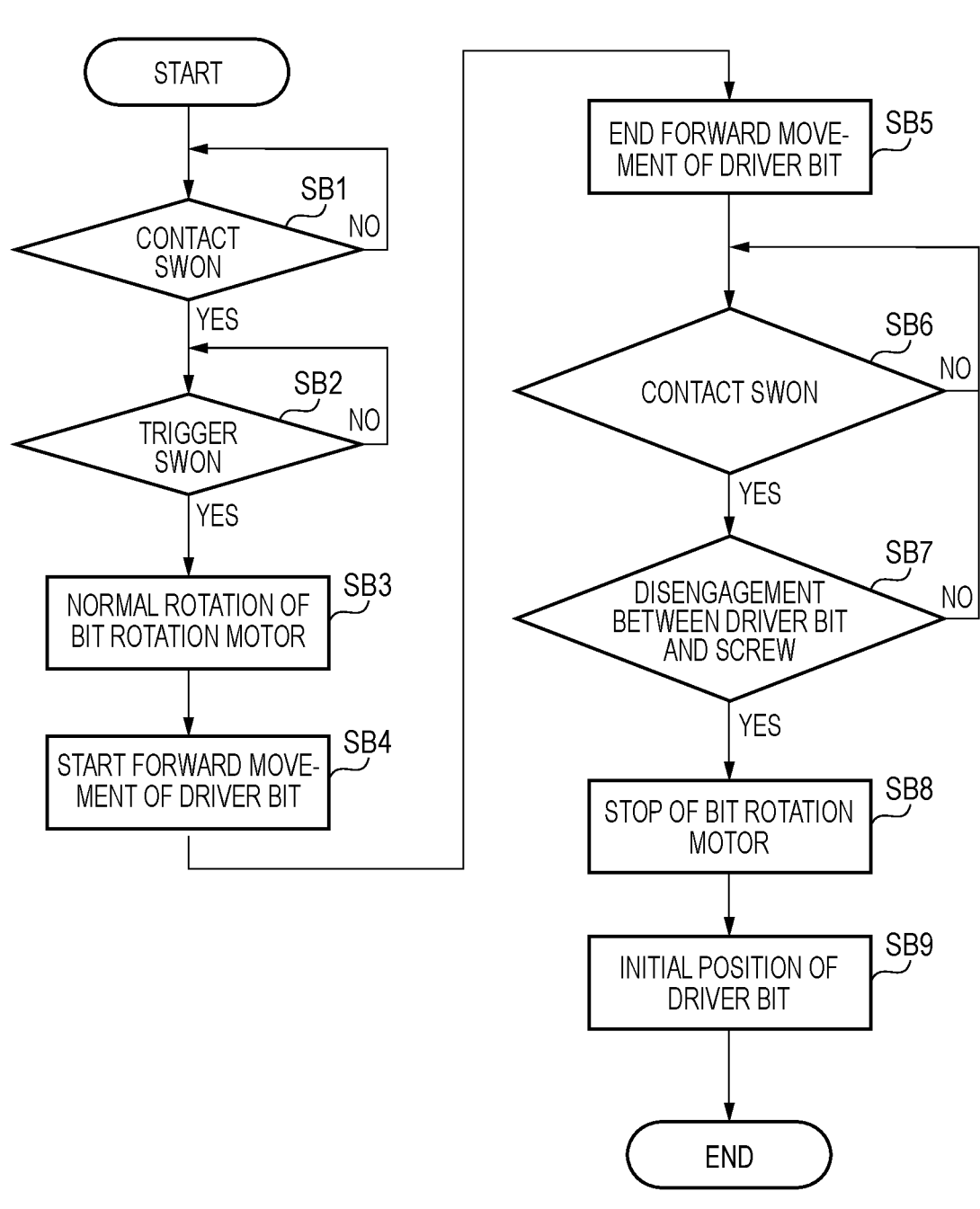
FIG. 10 is a flowchart showing another example of the operation of the fastening tool of the present embodiment.

FIG. 10 is a flowchart showing another example of the operation of the fastening tool of the present embodiment. The second driving portion 5 that moves the driver bit 2 held by the bit holding portion 3 in the axial direction may move the driver bit 2 (holding member 30) in the axial direction using a force biased by the biasing member such as a spring, a pressure of a gas, or the like. In the configuration in which the driver bit 2 (the holding member 30) is moved in the axial direction by using the force biased by the biasing member, the pressure of the gas, or the like, the movement amount of the driver bit 2 (the holding member 30) may be defined by a mechanical configuration such as a configuration in which the holding member 30 is brought into contact with a positioning member, and the control may be performed on an assumption that the driver bit 2 (the holding member 30) is moved to the predetermined forward movement end position. It may be considered that the driver bit 2 (holding member 30) is moved to the predetermined forward movement end position after elapse of time since the driver bit 2 (holding member 30) starts to move forward.

When the contact member 81 is pressed against the fastening target 202, the contact switch portion 84 is pressed by the contact arm 82 and is in the ON state in step SB1, the trigger 9 is operated, and the trigger switch portion 90 is in the ON state in step SB2, the controller 100 drives the bit rotation motor 40 of the first driving portion 4 in step SB3 and moves the driver bit 2 (holding member 30) forward in step SB4.

Accordingly, the driver bit 2 moves in the front direction and engages with the screw 200 supplied to the injection port 81*a* of the nose portion 8 to move the screw 200 in the front direction and to press the screw 200 against the fastening target 202.

When the bit rotation motor 40 is driven to rotate in the forward direction, which is one direction, the driver bit 2 held by the holding member 30 rotates the screw 200 in the forward direction and fastens the screw 200 to the fastening target 202.

Assuming that the tip of the driver bit 2 reaches the set forward movement end position P2, the controller 100 ends the forward movement of the driver bit 2 (holding member 30) in step SBS.

When the contact switch portion 84 is in the ON state in step SB6, the controller 100 continues to rotate the bit rotation motor 40 in the forward direction. The controller 100 determines, in step SB7, whether the driver bit 2 and the screw 200 are disengaged based on the state of the bit rotation motor 40 detected by the detector 112.

When determining that the driver bit 2 and the screw 200 are disengaged based on the state of the bit rotation motor 40 detected by the detector 112, the controller 100 stops the driving of the bit rotation motor 40 is step SB8, and then returns the driver bit 2 to the initial position in step SB9.

Accordingly, the rotation of the bit rotation motor 40 may be stopped at the timing when the screw 200 is fastened to the fastening target 202 until the head portion 201 of the screw 200 is in the flat state, and the fastening depth of the screw may be accurately managed.

Figure 11:
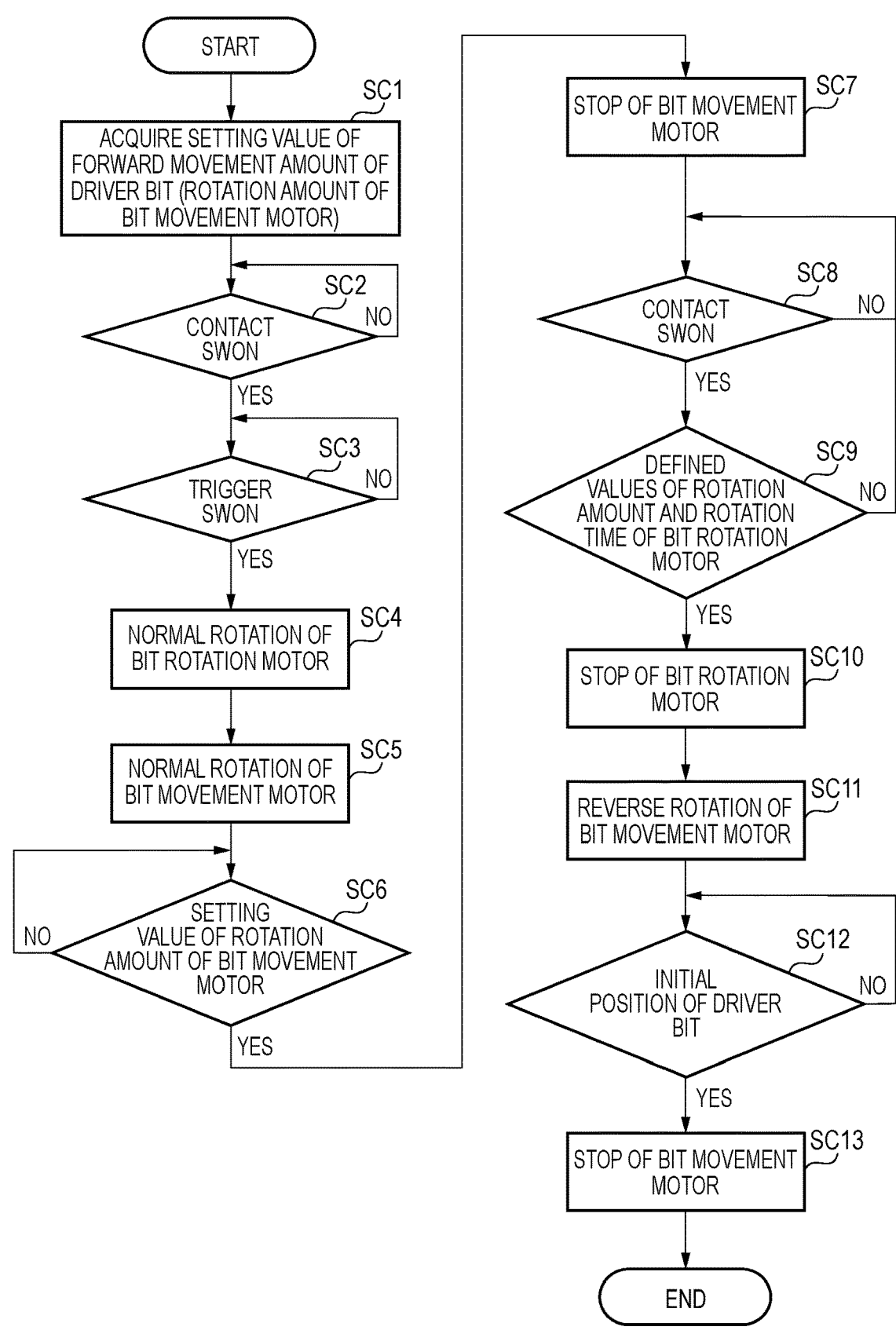
FIG. 11 is a flowchart showing another example of the operation of the fastening tool of the present embodiment.

FIG. 11 is a flowchart showing another example of the operation of the fastening tool of the present embodiment. The control to stop the bit rotation motor 40 may be performed based on a predetermined stop condition in which it is considered that the driver bit 2 and the screw 200 are disengaged.

In step SC1 of FIG. 11, the controller 100 sets the rotation amount of the bit movement motor 50, which defines the forward movement amount of the driver bit 2, based on the setting value selected by the setting portion 110. When the contact member 81 is pressed against the fastening target 202, the contact switch portion 84 is pressed by the contact arm 82 and is in the ON state in step SC2, the trigger 9 is operated, and the trigger switch portion 90 is in the ON state in step SC3, the controller 100 drives the bit rotation motor 40 of the first driving portion 4 in step SC4 and drives the bit movement motor 50 of the second driving portion 5 in step SC5.

Accordingly, the driver bit 2 held by the holding member 30 moves in the front direction, engages with the screw 200 supplied to the injection port 81*a* of the nose portion 8, moves the screw 200 in the front direction, and presses the screw 200 against the fastening target 202.

When the bit rotation motor 40 is driven to rotate in the forward direction, which is one direction, the driver bit 2 held by the holding member 30 rotates the screw 200 in the forward direction (clockwise) and fastens the screw 200 to the fastening target 202.

When the rotation amount of the bit movement motor 50 becomes the setting value selected by the setting portion 110 in step SC6 and the controller 100 determines that the tip of the driver bit 2 reaches the set forward movement end position P2, the controller 100 stops the rotation of the bit movement motor 50 in the forward direction in step SC7.

When the contact switch portion 84 is in the ON state in step SC8, the controller 100 continues to rotate the bit rotation motor 40 in the forward direction. In step SC9, the controller 100 determines whether a predetermined stop condition for stopping the rotation of the bit rotation motor 40 is satisfied after stopping the rotation of the bit movement motor 50.

The controller 100 stops the driving of the bit rotation motor 40 in step SC10 when determining that the rotation amount of the bit rotation motor 40 reaches a defined rotation amount corresponding to the disengagement between the driver bit 2 and the screw 200 as the predetermined stop condition of the bit rotation motor 40. Alternatively, the controller 100 stops the driving of the bit rotation motor 40 in step SC10 when determining that the drive duration time of the bit rotation motor 40 reaches a defined drive duration time corresponding to the disengagement between the driver bit 2 and the screw 200 as the predetermined stop condition of the bit rotation motor 40. When stopping the driving of the bit rotation motor 40 in step SC10, the controller 100 reversely rotates the bit movement motor 50 in step SC11.

When the bit movement motor 50 reversely rotates to a predetermined initial position and the holding member 30 and the moving member 32 move in the rear direction to the position where the tip of the driver bit 2 returns to the standby position P1 in step SC12, the controller 100 stops the reverse rotation of the bit movement motor 50 in step SC13.

The tip of the driver bit 2 reaches the forward movement end position P2 to stop the normal rotation of the bit movement motor 50, and thus after the normal movement of the driver bit 2 ends, the head portion 201 of the screw 200 is still in the state of floating from the fastening target 202, and the normal rotation of the bit rotation motor 40 is continued, whereby the screw 200 is further fastened to the fastening target 202.

It is possible to approximately estimate the rotation amount and the drive duration time of the bit rotation motor 40 required until the driver bit 2 and the screw 200 are disengaged by further normally rotating the bit rotation motor 40 from the state in which the head portion 201 of the screw 200 is floated from the fastening target 202.

Therefore, when it is determined that the rotation amount of the bit rotation motor 40 becomes a defined rotation amount corresponding to the disengagement between the driver bit 2 and the screw 200, it may be determined that the screw 200 is fastened to the fastening target 202 until the head portion 201 of the screw 200 is in the flat state by stopping the driving of the bit rotation motor 40 without detecting the disengagement between the driver bit 2 and the screw 200. In addition, when it is determined that the drive duration time of the bit rotation motor 40 becomes a defined drive duration time corresponding to the disengagement between the driver bit 2 and the screw 200, it may be determined that the screw 200 is fastened to the fastening target 202 until the head portion 201 of the screw 200 is in the flat state by stopping the driving of the bit rotation motor 40 without detecting the disengagement between the driver bit 2 and the screw 200.

Modification of Fastening Tool of The Present Embodiment

Figure 12A:
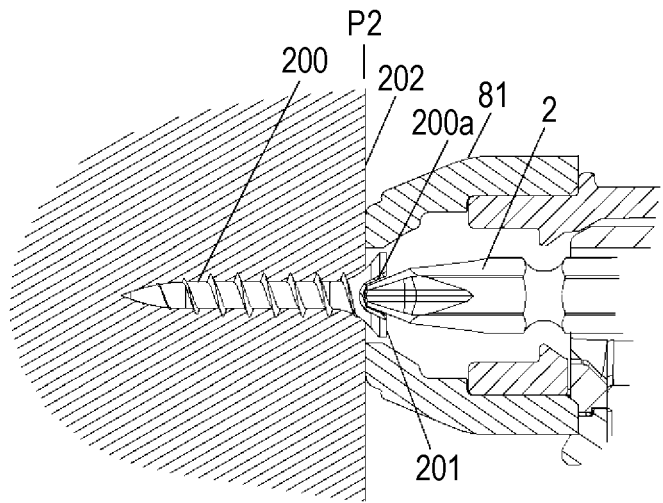
FIG. 12A is a cross-sectional view showing the fastened state of the screw.
Figure 12B:
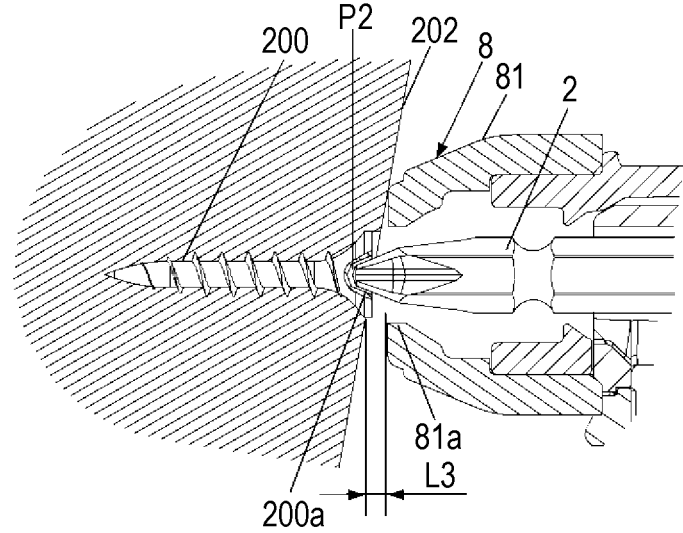
FIG. 12B is a cross-sectional view showing the fastened state of the screw.

FIGS. 12A and 12B are cross-sectional views showing the fastened state of the screw. Next, a modification of the fastening tool of the present embodiment will be described with reference to the drawings.

In addition to an operation of the fastening tool 1 fastening the screw 200 in a substantially vertical direction with respect to a surface of the fastening target 202 as shown in FIG. 12A, in a fastening operation at an inner corner or the like (for example, a recessed corner formed by two orthogonal surfaces), in a state where the fastening tool 1 is not brought into contact with the fastening target 202 perpendicularly, as shown in FIG. 12B, an operation referred to as oblique driving in which the screw 200 is inclined and fastened with respect to a surface of the fastening target 202 is also considered.

In the oblique driving operation in which the screw 200 is inclined and fastened by the fastening tool 1 with respect to the surface of the fastening target 202, a part of the tip of the contact member 81 comes into contact with the fastening target 202, and a gap L3 is generated between the injection port 81*a* of the nose portion 8 and the fastening target 202. Therefore, when the rotation of the bit movement motor 50 is stopped at a stage where the tip of the driver bit 2 reaches the forward movement end position P2 set in advance with the operation of fastening the screw 200 in a substantially vertical direction with respect to the surface of the fastening target 202, the movement amount (forward movement amount) of the driver bit 2 may be insufficient.

Therefore, it is possible to set the forward movement end position P2 in accordance with the oblique driving operation by the setting portion 110. In the setting of the forward movement end position P2 in accordance with the oblique driving movement (also referred to as an oblique driving mode), the movement amount (forward movement amount) of the driver bit 2 is increased in a stepwise manner by the operation of the setting portion 110, and the forward movement end position P2 may be selected.

In the setting of the forward movement end position P2 in the oblique driving mode, for example, any one of the operation portions 110*a* configured by buttons is assigned to the same setting, and the forward movement end position P2 is switched every time the operation portion 110*a* is pressed once. In the setting of the forward movement end position P2 in the oblique driving mode, a change rate of the movement amount (forward movement amount) of the driver bit 2 is set to be larger than that in the case where the forward movement end position P2 is finely adjusted. In addition, several types of forward movement end positions P2 may be selectable according to an angle at which the screw 200 is inclined with respect to the surface of the fastening target 202. Therefore, the forward movement end position P2 in accordance with the oblique driving mode may be quickly and easily set as compared with the case where the forward movement end position P2 is finely adjusted.

What is claimed is:

1. A fastening tool comprising:
   a bit holding portion configured to hold a driver bit engageable with a screw and that is rotatable in a circumferential direction and movable in an axial direction of the held driver bit;
   a motor configured to rotate the bit holding portion;
   a controller configured to control the motor;
   a detector configured to detect a state of the motor; and
   a position detector configured to detect a position of the bit holding portion, wherein:
   in a state where the screw engaged with the driver bit is fastened to a fastening target, the controller determines whether the driver bit and the screw are disengaged based on the state of the motor detected by the detector and stops the rotation of the motor in a case where the controller determines that the driver bit and the screw are disengaged, and
   the controller determines whether the driver bit and the screw are disengaged after the position of the bit holding portion is moved to a stop determination allowable position.

2. The fastening tool according to claim 1, wherein the stop determination allowable position is a forward movement end position of the bit holding portion.

3. The fastening tool according to claim 2, wherein the detector is configured to detect a rotation amount of the motor, and
   the controller is configured to determine whether the driver bit and the screw are disengaged based on the rotation amount detected by the detector.

4. The fastening tool according to claim 2, wherein the detector is configured to detect a drive duration time of the motor, and
   the controller is configured to determine whether the driver bit and the screw are disengaged based on the drive duration time detected by the detector.

5. The fastening tool according to claim 1, wherein the detector is configured to detect a rotation amount of the motor, and the controller is configured to determine whether the detected rotation amount of the motor reaches a stop determination allowable rotation amount and to determine whether the driver bit and the screw are disengaged in a case where the rotation amount reaches the stop determination allowable rotation amount.

6. A fastening tool comprising:

a bit holding portion configured to hold a driver bit engageable with a screw and that is rotatable in a circumferential direction and movable in an axial direction of the held driver bit;

a motor configured to rotate the bit holding portion;

a controller configured to control the motor;

a detector configured to detect a state of the motor;

a contact member movable in the axial direction of the driver bit; and a contact switch portion configured to switch ON and OFF according to a position of the contact member, wherein:

in a state where the screw engaged with the driver bit is fastened to a fastening target, the controller determines whether the driver bit and the screw are disengaged based on the state of the motor detected by the detector and stops the rotation of the motor in a case where the controller determines that the driver bit and the screw are disengaged, and the controller is configured to determine whether the driver bit and the screw are disengaged in a case where the contact switch portion is in the ON state.

7. The fastening tool according to claim 1, wherein the detector is configured to detect a current value of the motor, and the controller is configured to determine whether the driver bit and the screw are disengaged based on the current value detected by the detector.

8. The fastening tool according to claim 1, wherein the detector is configured to detect a rotation speed of the motor, and the controller is configured to determine whether the driver bit and the screw are disengaged based on the rotation speed detected by the detector.

\* \* \* \* \*